United States Patent [19]
von Gaisberg

[11] Patent Number: 5,641,048
[45] Date of Patent: Jun. 24, 1997

[54] FRICTION CLUTCH

[75] Inventor: Alexander von Gaisberg, Beilstein, Germany

[73] Assignee: LuK Lamellen und Kupplungsbau GmbH, Bühl, Germany

[21] Appl. No.: 466,675

[22] Filed: Jun. 6, 1995

[30] Foreign Application Priority Data

Nov. 14, 1994 [DE] Germany ............... 44 40 616.9

[51] Int. Cl.[6] ....................................... F16D 13/75
[52] U.S. Cl. ..................... 192/70.25; 192/111 A
[58] Field of Search ................. 192/70.25, 111 A

[56] References Cited

U.S. PATENT DOCUMENTS 5,409,091  4/1995  Reik et al. ............... 192/70.25

FOREIGN PATENT DOCUMENTS

4239289A1  5/1993  Germany .
4239291A1  5/1993  Germany .
4322677A1  1/1994  Germany .

*Primary Examiner*—Richard M. Lorence
*Attorney, Agent, or Firm*—Darby & Darby

[57] ABSTRACT

A friction clutch wherein the wear upon the friction linings of the clutch disc and, if necessary, upon the friction surfaces of the pressure plate and the counterpressure plate is compensated for by an adjusting unit which can shift the pressure plate toward the counterpressure plate to the extent which is necessary to compensate for wear. The friction clutch is further provided with a blocking or braking mechanism which can respond to the action of centrifugal force to prevent shifting of the pressure plate, e.g., in response to vibratory movements of the prime mover which transmits torque to the rotary components of the friction clutch, under circumstances when such shifting of the pressure plate is not necessary due to absence of wear, or additional wear, upon the pressure plate, the counterpressure plate and/or the friction linings.

19 Claims, 11 Drawing Sheets

５,641,048

FRICTION CLUTCH

BACKGROUND OF THE INVENTION

The invention relates to a friction clutch, particularly for transmission of torque in a motor vehicle, with a pressure plate which is non-rotatably connected to a housing with limited freedom of axial movement, at least one biasing spring being operative between the housing and the pressure plate to act upon the pressure plate in a direction toward a clutch disc which can be clamped between the pressure plate and a counterpressure plate, such as for example a flywheel, the friction clutch having actuating means for engagement and disengagement as well as an adjusting assembly which compensates for the wear upon the friction linings of the clutch disc by resetting the pressure plate and which comprises at least one structural element which is not only displaceable relative to at least one of two parts, namely the housing and the pressure plate, but is also supportable by the housing or by the pressure plate.

Such friction clutches are proposed, for example, in published German patent applications 42 39 289 and 42 39 291. Thus, there are already known not only friction clutches wherein the adjusting assembly is installed between the housing and a biasing spring which constitutes a diaphragm spring but also those wherein the adjusting assembly is disposed in the power flow between the friction surface of the pressure plate or pressure disc and the biasing spring. Therefore, and as concerns the construction, the mode of operation and the mounting of such adjusting assemblies within a friction clutch, reference should be had to the aforementioned publications the disclosures of which are to be considered as being incorporated into the present application.

OBJECTS OF THE INVENTION

The object underlying the present invention is to optimize such friction clutches as regards their mode of operation. It is particularly important that the invention prevent any undesired adjustment within the adjusting assembly in a very simple and economical manner.

SUMMARY OF THE INVENTION

In accordance with the invention, this is accomplished in friction clutches of the aforedescribed character in that at least one structural element of the adjusting assembly, which element is not only displaceable relative to at least one of two parts, namely the housing and the pressure plate, but is also supportable by the housing or by the pressure plate, is adapted to be blocked—in dependency upon at least one parameter which develops when the friction clutch is in use—by being urged to move in at least one of two directions, namely in the axial direction and in the circumferential direction of the friction clutch, relative to that one of two parts, namely the housing and the pressure plate, against which it is being urged by the force furnished by the biasing spring.

By resorting to the novel undertaking, one can ensure that no undesired adjustment which could adversely affect proper operation of the friction clutch can take place at least within those operating ranges or operating conditions of the friction clutch when there arise or develop circumstances which are critical for the operation of the adjusting assembly. For example, such unintentional adjustment can take place in response to vibrations which effect a relative movement between those structural parts or structural elements of the adjusting assembly which compensate for wear upon the friction linings. Such vibrations can be generated particularly as a result of axial oscillations and flexural oscillations of the combustion engine because such oscillations are transmitted, at least in part, to the clutch. Furthermore, individual parts are being acted upon by forces which develop due to the mass of such parts as well as due to torsional vibrations and/or accelerations which are being transmitted thereto. Such torsional vibrations are generated as a result of abrupt changes of load as well as by the combustion engine.

It can be of particular advantage if the adjusting assembly comprises at least one structural element which is acted upon in the axial direction by the force generated by the biasing spring and includes at least portions which bear upon at least one further structural element due to the action upon such portions by centrifugal force which develops in response to rotation of the friction clutch. This results in the establishment of a form- or frictionally locking connection between the structural elements and such connection prevents undesirable adjustment in the adjusting assembly. It is of advantage if the structural element which is being acted upon axially by the biasing means is an annular structural element and such annular structural element can be provided with adjusting ramps which slope in the axial direction. By way of such adjusting ramps, the annular structural element can be shifted axially relative to the housing or relative to the pressure plate in the course of an adjusting operation and to an extent corresponding to the developed wear upon the friction linings. The adjusting ramps which are carried or supported by the annular structural element are preferably adapted to cooperate with corresponding complementary sloping ramps which are provided on the housing or on the pressure plate or are axially supported by one of these component parts.

It can be of particular advantage for the mode of operation and for the construction of the friction clutch if the biasing spring is constituted by a diaphragm spring which, on the one hand, is tiltable relative to an annular seat assembly carried by the housing and, on the other hand, acts upon the pressure plate. The adjusting assembly can comprise at least one annular structural element which can be acted upon by the force generated by the diaphragm spring and can expand in the radial direction under the action of centrifugal force to thus render possible the establishment of a form- or frictional lock between the annular structural element and a further structural element of the friction clutch whereby the thus established lock prevents adjustments by the adjusting assembly.

Those portions of the structural element which are indirectly or directly acted upon by the biasing spring and are being supported under the action of centrifugal force in order to prevent or block the adjusting assembly from carrying out an adjusting action preferably cooperate with abutment- or supporting portions which are carried by the housing or by the pressure plate. For example, such supporting portions can be formed by a ring-shaped shoulder which constitutes a radial abutment. However, such supporting portions can also include several axial projections. For example, if the housing which is being used is made of sheet metal, it is possible to shift several tongues out of the sheet metal housing so that the tongues extend in the axial direction. It is also possible to provide axial projections on the structural element which can be acted upon by the diaphragm spring and to cause such projections to extend into openings in the housing or in the pressure plate and to be radially supported in the region of such openings when the friction clutch rotates to thus establish a frictional or form-locking action which blocks the adjusting assembly.

In an advantageous manner, the annular structural element can be acted upon directly by the biasing spring and bears upon portions which are fixedly connected with the housing or with the pressure plate when acted upon by centrifugal force. The annular structural element, which can carry sloping or adjusting ramps, can be designed in an advantageous manner to be deformable, resiliently or in springy fashion, in the radial direction. The annular structural element can be radially deformable in its entirety, namely along its entire circumference, or it can merely comprise only sections which constitute radially displaceable portions. It can be of particular advantage if—as considered in the circumferential direction—the annular structural element is provided with an interruption at least at one location. However, it can also be of advantage if the annular structural element is uninterrupted—as considered in the circumferential direction—and it is then of additional advantage if such element comprises at least one section or portion which is resiliently yieldable at least in the circumferential direction so that the annular structural element can expand under the action of centrifugal force. If one utilizes an annular structural element which is provided with at least one interruption as seen in the circumferential direction, it can be of particular advantage to provide a flyweight or mass which effects radial expansion of the element in the region of such interruption. The interruption can have a wedge-like or conical shape, as seen in the radial direction, and the apex pointing in the direction of narrowing of the interruption preferably points radially outwardly. A flyweight or mass, which conforms to the lateral flanks of the interruption, can be provided in the region of such interruption. Such a flyweight or mass preferably consists of a material having a larger specific mass than the material of which the annular structural element is made. For example, the annular structural element can be made of a plastic material and the flyweight or mass can be made of a metal.

In order to ensure satisfactory blocking of the adjusting assembly, it might be desirable if the annular structural element or the flyweight or mass is provided with a profiling, such as for example a detent, which due to the action of centrifugal force upon the annular structural element and/or upon the flyweight or mass can be moved into engagement with a complementary profiling or complementary detent carried by the cover or by the pressure plate. The expansion of the profiling and/or complementary profiling, as seen in the circumferential direction of the friction clutch, must be selected in such a way that one ensures an engagement between the profiling and the complementary profiling during the entire useful life of the friction clutch.

In accordance with a further possible embodiment, the annular structural element can be uninterrupted and practically rigid in the radial direction if it carries at least one flyweight which is displaceable relative to the annular main body portion of the structural element under the action of centrifugal force. In this manner, one can reliably prevent rotation of the element by causing the flyweight to bear upon parts which are connected with the housing or with the pressure plate. In an advantageous manner, the flyweight can be pivotably mounted on the annular structural element. For example, the annular structural element can comprise to this end a flyweight which is of one piece therewith and is connected with the main body portion of the structural element by a resiliently deformable portion which acts not unlike a joint or hinge. However, the flyweight can also constitute a separate element which is pivotably mounted on the annular structural element.

In accordance with a further modification, one can provide at least one element which is movably and/or pivotably carried by the clutch housing or by the pressure plate and is supported by or exerts upon the annular structural element a force under the action of centrifugal force to thus prevent an adjustment of the annular structural element or of the adjusting assembly.

The flyweight or elements whose action depends upon centrifugal force and which effect a blocking of the adjusting assembly can exert upon the annular element a radially and/or an axially oriented force. The flyweights or the elements whose action depends upon centrifugal force can also bear upon the housing or upon the pressure plate in the radial and/or axial direction. The flyweight or the elements whose action depends upon centrifugal force can cooperate, in a manner not unlike the operation of a brake, with those portions or sections of the annular structural element, of the housing or of the pressure plate which are being contacted thereby.

In accordance with a further possible embodiment of the invention, one can provide in the friction clutch at least one temperature-dependent device or part which blocks and/or releases the adjusting assembly in dependency upon the temperature prevailing in the region of the friction clutch. In an advantageous manner, the device can comprise a thermoelement or an element which can be thermally influenced or an element whose operation is based on the memory principle.

Furthermore, one can arrive at a particularly simple construction of the friction clutch by providing an arrangement which prevents undesirable adjustment by the adjusting assembly when the friction clutch is engaged whereas, when the friction clutch is disengaged, such arrangement is unlocked to thus permit an adjustment which compensates for wear.

The device which prevents undesirable adjustment by the adjusting assembly can be designed in such a way that the adjusting assembly is blocked above a predetermined RPM of the friction clutch. This can take place, for example, at an RPM which at least approximates the idling RPM or an RPM below the idling RPM so that an adjustment to compensate for wear can take place only at low RPMs. However, it can also be desirable or advantageous if the blocking device is effective already at very low RPMs so that, for all practical purposes, an adjustment is possible only when the combustion engine is idle, i.e., when the friction clutch does not rotate.

However, the blocking device can also be designed in such a way that it is effective only within those RPM ranges which are critical for the adjusting assembly.

BRIEF DESCRIPTION OF THE DRAWINGS

The invention will be explained in greater detail with reference to FIGS. 1 to 11.

There are shown in.

DESCRIPTION OF PREFERRED EMBODIMENTS

Figure 1:
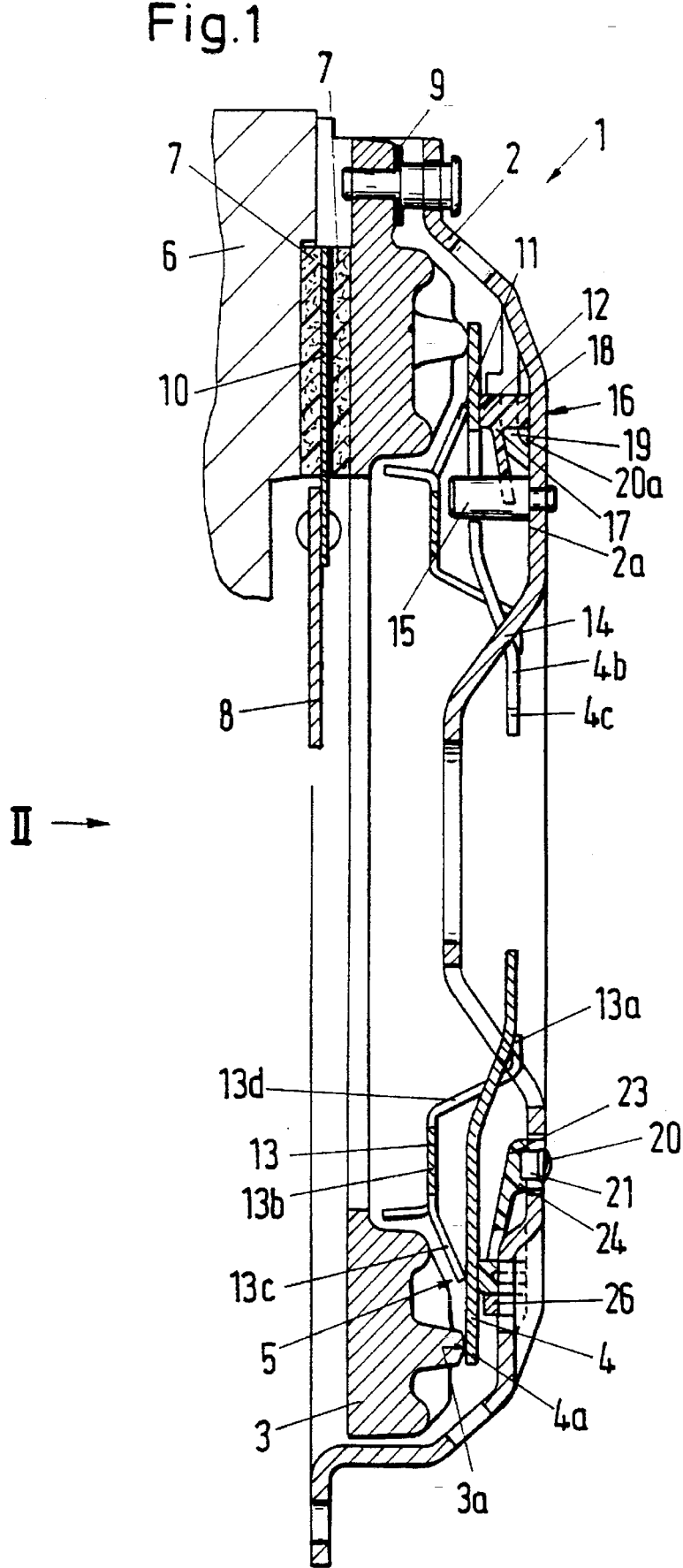
FIG. 1 a sectional view of a friction clutch embodying the invention.
Figure 2:
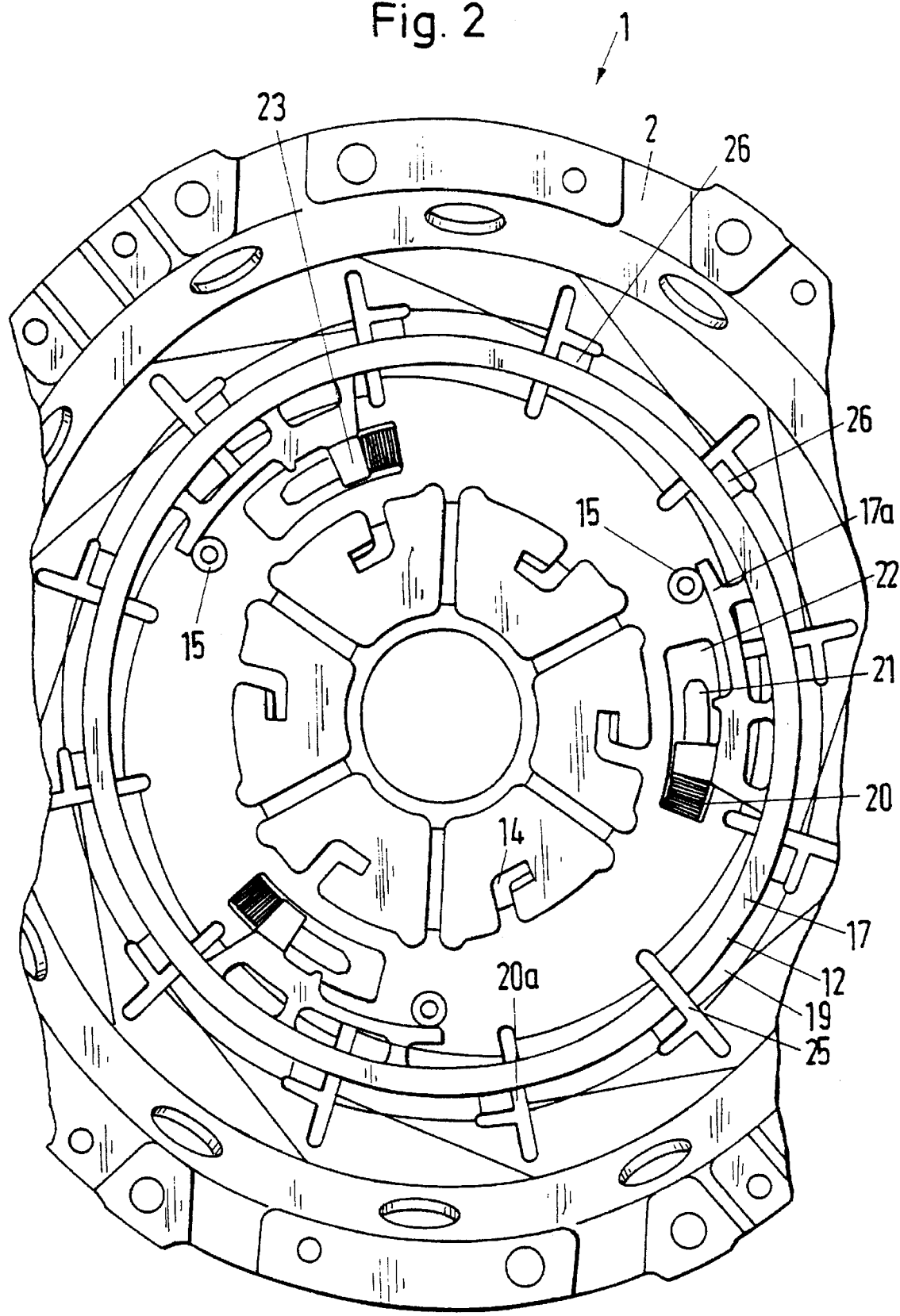
FIG. 2 a view as seen in the direction of arrow II in FIG. 1 but without the pressure disc and the diaphragm spring, and FIGS. 3–11 further possible embodiments of an adjusting assembly which can be blocked in accordance with the invention.

The friction clutch 1 which is shown in FIGS. 1 and 2 comprises a housing or cover 2 and a pressure plate or pressure disc 3 which is non-rotatably connected with but has limited freedom of axial movement relative to the housing. A biasing diaphragm spring or clutch spring 4 is installed in stressed condition axially between the pressure plate 3 and the housing 2 so that it is tiltable relative to a ring-shaped seat assembly 5 which is carried by the housing 2. The spring 4 urges the pressure plate 3 in a direction toward a counterpressure plate 6, such as for example a flywheel, which is fixedly connected with the housing 2 by means of threaded fasteners. This results in clamping of the friction linings 7 on a clutch disc 8 between the friction surfaces of the pressure plate 3 and the counterpressure plate 6.

The pressure plate 3 is non-rotatably connected with the housing 2 by leaf springs 9 which extend in the circumferential or tangential direction. In the illustrated embodiment, the clutch disc 8 comprises so-called resilient cushioning segments 10 for friction linings 7 which segments ensure a gradual buildup of torque during engagement of the friction clutch 1 in that they enable the two sets of friction linings 7 to perform a limited axial movement in a direction toward each other with attendant progressive increase of axial forces acting upon the friction linings 7. However, it would be equally possible to employ a clutch disc in which the friction linings 7 would be mounted on a disc-shaped carrier in such a way that they would be practically rigid in the axial direction.

In the illustrated embodiment, the diaphragm spring 4 comprises a ring-shaped main body portion 4a which applies the biasing force and from which extend radially inwardly oriented actuating tongues or prongs 4b. The diaphragm spring 4 is installed in such a way that its radially outer portions act upon the pressure plate 3 and that those portions which are located further radially inwardly are tiltable realative to the seat assembly 5.

The seat assembly 5 comprises two seats 11, 12 and the diaphragm spring 4 is axially held or clamped between such seats. The seat 11 is adjacent that side of the diaphragm spring 4 which faces the pressure plate 3 and is biased by an energy storing device 13 axially in a direction toward the housing 2. The energy storing device 13 constitutes a diaphragm spring or a structural element which resembles a diaphragm spring and includes radially inner marginal portions 13a abutting the housing 2 as well as sections 13c which are located further radially outwardly and together constitute the seat 11. Consequently, the seat 11 is acted upon in a direction toward the biasing diaphragm spring 4 and hence axially in a direction toward the housing 2. The diaphragm spring 13, which is installed between the pressure plate 3 and the biasing diaphragm spring 4, comprises a ring-shaped main body portion 13b and the aforementioned outwardly projecting sections or tongues 13c which project radially from the outer marginal part of the main body portion 13b and constitute the seat 11. The radially inner part of the main body portion 13b is provided with arms 13d which cooperate with abutments 14 (FIG. 2) being of one piece with the housing 2. A connection or lock resembling a bayonet mount is provided between the abutments 14 and the arms 13d of the diaphragm spring shaped structural element 13. Once the diaphragm spring shaped structural element 13 has been prestressed in the axial direction and its radially inner portions 13a or its arms 13d have been placed axially over the abutments 14, an appropriate angular movement of the diaphragm spring shaped structural element 13 relative to the housing 2 ensures that the arms 13d of the structural element 13 can be moved into engagement with the abutments 14.

In order to prevent rotation of the biasing diaphragm spring 4 relative to the housing 2, the latter is provided with axially extending centering means in the form of rivet elements 15 each of which comprises an axially extending shank passing axially through a cutout provided between the adjacent prongs 4b of the diaphragm spring.

The diaphragm spring shaped structural element or diaphragm spring 13 constitutes a sensor spring which generates an at least substantially constant force through a predetermined working distance. If the leaf spring elements 9 furnish an axially oriented force between the housing 2 and the pressure plate 3, such force is superimposed upon the axial force furnished by the sensor spring 13. If the leaf spring elements 9 are installed in the friction clutch 1 in such a way that they act upon the pressure plate 3 axially in a direction toward the housing 2, i.e., toward the diaphragm spring 4, the axial forces which are generated by the leaf spring elements 9 are added to the axial forces which are generated by the sensor spring 13 to jointly form a so-called resultant sensor force acting upon the diaphragm spring 4. Thus, in selecting the characteristics of the sensor spring 13, it is always necessary to take into consideration the aforediscussed superimposed forces. The axial force which is generated by the leaf spring elements 9 is also superimposed upon the force which the diaphragm spring 4 applies to the pressure plate 3 so that, when the leaf spring elements 9 are prestressed in a sense to tend to lift the pressure disc 3 off the clutch plate 8, the axial clamping force which the pressure plate 3 applies to the friction linings 7 is smaller, by the force supplied by the leaf spring elements, than the axial force which the diaphragm spring 4 applies to the pressure plate 3. The resultant sensor force which is generated by the leaf spring elements 9 in conjunction with the sensor spring 13 takes up the clutch disengaging force acting upon the tips 4c of the prongs or tongues 4b. This ensures that, at least when the clutch is not rotated and at least when the friction linings 7 are released, an at least substantial equilibrium is established between the force which is being applied by the disengaging force to the seat 11 and the resultant sensor force acting upon such seat 11. The term disengaging force is intended to denote that force which, during actuation of the friction clutch 1, is being applied to the tips 4c of and hence to the disengaging levers of the diaphragm spring clutch- Such disengaging force can vary in the region of the tips 4c of the prongs or tongues in the course of a disengaging operation.

The seat 12 which is disposed axially between the diaphragm spring 4 and the housing 2 is supported by the housing 2 by way of an adjusting assembly 16. This adjusting assembly 16 ensures that no undesired clearance or play can deveop between the seat 12 and the housing 2 or between the seat 12 and the diaphragm spring 4 in response to axial displacement of the seats 11 and 12 in a direction toward the pressure plate 3, i.e., in a direction toward the counterpressure plate 6. This ensures that no undesirable dead runs or idle runs develop in response to actuation of the friction clutch 1, and this ensures an optimum efficiency and hence a proper operation of the friction clutch 1. The axial shifting of the seats 11 and 12 takes place in response to axial wear upon the friction surfaces of the pressure plate 3 and counterpressure plate 6 as well as upon the friction linings 7.

The adjusting assembly 16 comprises a spring biased adjusting element in the form of an annular structural element 17 which comprises circumferentially extending and axially sloping ascending ramps 18 which are distributed in the circumferential direction of the structural element 17. The adjusting element 17 is installed in the clutch 1 in such a way that the ascending ramps 18 confront the bottom 2a of the housing.

In the illustrated embodiment, the adjusting element 17 is made of a plastic material, such as for example a heat-resistant thermoplastic substance, which can be reinforced by fibers if necessary. In this manner, the adjusting element 17 can be produced in a simple manner as an injection molded article.

The ascending ramps 18 of the adjusting ring 17 abut complementary ramps 19 which are impressed into the bottom 2a of the housing. The impressions which are provided in the housing and constitute the complementary ramps 19 are designed in such a way that each thereof establishes an air flow passage 20a as seen in the direction of rotation of the clutch 1. Owing to such design, one achieves a more satisfactory cooling of the component parts of the clutch 1, especially of the plastic adjusting ring 17, when the clutch 1 is caused to rotate. The impressions in the housing are designed in such a way that they effect a forced circulation of air within the clutch space which is bounded by the housing 2.

As regards their length in the circumferential direction and their angles of slope, the ramps 18, 19 are designed in such a way that they permit the adjusting ring 17 to turn relative to the housing 2 at least through an angle which ensures an adjustment to compensate for wear upon the friction surfaces of the pressure plate 3 and the counterpressure plate 6, as well as upon the friction linings 7, during the entire useful life of the friction clutch 1. Depending upon the design of the ascending ramps, such adjustment angle can be within the range of between 8 and 60 degrees, preferably within the range of between 10 and 30 degrees. The angle of slope of the ramps 18, 19 can be within the range of between 4 and 12 degrees. This angle is preferably selected in such a way that the friction which develops when the ascending ramps 18 are pressed against the complementary ramps 19 prevents a slip of the ramps 18, 19 relative to each other.

The adjusting ring 17 is spring biased in the circumferential direction, namely in the direction of adjustment, i.e., in the direction which effects, as a result of movement of the ramps 18 relative to the complementary ramps 19, an axial displacement of the adjusting ring in a direction toward the pressure plate 3, namely in the axial direction and away from the radial housing section 2a.

As can be seen by referring to FIG. 2, the spring bias upon the adjusting ring 17 is ensured by discrete coil springs 20 which extend in the circumferential direction of the housing 2 and are stressed between the adjusting ring 17 and the housing 2. It is presently preferred to provide three such coil springs 20 which are uniformly distributed in the circumferential direction. The individual coil springs 20 are mounted on or threaded onto lugs 21 with are of one piece with the clutch housing 2. The lugs 21 are formed from the metallic sheet material of the housing 2, for example, by forming for each lug a stamped out U-shaped cutout. As considered in the circumferential direction, the lugs 21 extend along arcs or tangentially and are preferably disposed at least close to the axial level of the immediately adjacent portions of the housing. The width of the lugs 21 is selected in such a way that the coil springs 20 which are mounted thereon are guided not only in the radial direction but also in the axial direction. The adjusting ring 17, which is acted upon by the springs 20 in the direction of adjustment, is provided with projections or arms 23 which extend radially inwardly from its radially inner marginal portion and the radially inner part of each of which comprises a fork or U-shaped configuration 24 extending in the axial direction. Each of the U-shaped configurations 24 provides two tines (FIG. 1) which extend in the axial direction and each of which flanks one of the spring guiding lugs 21 at both sides. To this end, the two tines extend axially in or through a cutout or window 22 of the housing 2.

When the friction clutch 1 is still new, the axial protuberances which constitute the ascending ramps 18 and the complementary ramps 19 are axially interlaced to a maximum extent; this means that the ring 17, and hence also the seat assembly 5, is located at the shortest distance from the bottom 2a of the housing.

The position of the diaphragm spring shaped element 13 in the friction clutch 1 is selected in such a way that, in the region of the seat assembly 5, the element 13 can cover in a direction toward the friction linings 7 a distance which at least matches the extent of that axial adjustment of the pressure plate 3 in a direction toward the counterpressure plate 6 which develops due to wear upon the friction surfaces and the friction linings. The length of the at least approximately linear portion of the characteristic curve of the diaphragm spring shaped element 13 preferably exceeds the aforementioned distance to be covered due to wear because, in this manner, one can at least partially compensate for tolerances developing during assembly of the friction clutch.

In order to ensure optimal operation of the friction clutch 1 and of the adjusting assembly 16 which is to guarantee automatic compensation for wear upon the friction linings, it is advisable that, during disengagement or disengaging movement of the friction clutch 1, the resultant momentary force which is being initially applied to the diaphragm spring 4 by the resilient cushioning segments 10 for the friction linings, by the sensor spring 13 and by the leaf springs 9, as well as the resultant momentary force which is being applied to the diaphragm spring 4 only by the sensor spring 13 and by the leaf springs 9 during and/or subsequent to movement of the pressure plate 3 away from contact with the friction linings 7 be slightly larger than but at least equal to the momentary disengaging force which varies during disengagement and acts in the actuating zone upon the tips 4c forming part of tongues or prongs of the diaphragm spring.

In response to axial wear, particularly upon the friction linings 7, the position of the pressure plate 3 is shifted in a direction toward the counterpressure plate 6 which entails a change of the conicity and hence also of the biasing force which is being applied by the diaphragm spring 4 in the engaged condition of the friction clutch 1, namely the magnitude of such force increases.

Due to such changes, the equilibrium of forces which existed in the region of the seat 11 between the biasing diaphragm spring 4 and the sensor spring 13 is disturbed during disengagement of the clutch 1' at least while the clutch does not rotate. The increase of the force being applied by the diaphragm spring 4 to the pressure plate 3 as a result of wear upon the friction linings further effects a shifting of the progress of the disengaging force in a sense toward an increase of such force. Due to an increase of the disengaging force, the resultant axial force being applied to the diaphragm spring 4 by the sensor spring 13 and the leaf springs 9 is overcome so that the sensor spring 13 yields in the region of the seat assembly 5 through an axial distance which corresponds essentially to the wear upon the friction linings 7.

During such deformation stage of the sensor spring 13, the diaphragm spring 4 pivots relative to the fulcrum 3a of the pressure plate 3 so that the conicity of the diaphragm spring 4 changes with attendant change of energy which is being stored in the spring 4, i.e., the torque which is being stored in the spring 4 and consequently also the force with which the diaphragm spring 4 bears upon the seat 11 and the sensor spring 13 as well as upon the pressure disc 3. Such change takes place in a direction toward a reduction of the force which is being supplied by the diaphragm spring 4. Such change takes place until the axial force exerted by the diaphragm spring 4 upon the sensor spring 13 in the region of the seat 11 is in a state of equilibrium with the opposing force being applied by the sensor spring 13 jointly with the leaf springs 9. Once such state of equilibrium is reestablished, the pressure plate 3 is again free to move away from the friction linings 7. During such stage of adjustment for the wear while the friction clutch 1 is being disengaged, the adjusting element 17 of the adjusting assembly 16 is caused to turn by the prestressed springs 20 whereby the seat 12 trails such movement of the element 17 to an extent corresponding to the extent of wear upon the friction linings to thus ensure a clearance-free tiltable or pivotable mounting of the diaphragm spring 4 in the seat assembly 5. The original progress of the disengaging force is reestablished upon completion of the adjusting operation.

In actual practice, the aforedescribed adjustment takes place continuously, i.e., in very small steps.

As regards additional functional characteristics as well as structural criteria which can be embodied with advantage in the novel friction clutch, reference should be had to the published German patent applications Nos. 42 39 289, 42 39 291 and 43 22 677. The disclosures of these publications should be considered as being integrated into the present application. These publications disclose the required characteristic curves of the diaphragm spring 4, of the diaphragm spring like structural part 13, of the cushioning segments 10 for the friction linings 7 as well as of the leaf springs 9. Furthermore, these publications describe that mode of cooperation between individual spring elements which ensures a satisfactory operation of the friction clutch 1 as well as of the adjusting assembly 16.

Under many circumstances of use, the vibrations which develop during rotation of the friction clutch and which are caused to develop particularly by the engine or during abrupt changes of load entail an undesirable operation of the adjusting assembly 16. Such vibrations which are critical for the adjusting assembly 16 are generated, among other reasons, as a result of axial vibrations and flexural vibrations of the crankshaft of the engine because such vibrations are being transmitted to the friction clutch 1. For example, when the friction clutch 1 is disengaged, such vibrations can cause axial vibrations of the pressure plate 3 so that the pressure plate is then lifted off the main- or diaphragm spring 4 for short intervals of time whereby the resultant sensor force disappears during such short intervals because, at such times, the axial force which is being generated by the leaf spring like torque transmitting means 9 no longer acts upon the diaphragm spring 4. This can entail that the relationship of forces between the diaphragm spring 4 or the disengaging force acting upon such spring and the resultant supporting or abutment force acting upon such diaphragm spring 4 which is required for a planned adjustment by the assembly 16 is disturbed whereby the clutch is likely to adjust prematurely, i.e., at an inopportune time. Among other drawbacks, this results in a shift of the operating range of the diaphragm spring 4.

Furthermore, in the event of certain operating conditions of the engine and/or due to very rapid changes of the position of the gas pedal, there can develop abrupt changes of load which, in turn, cause very pronounced cirumferential accelerations. Due to inertia of structural parts of the friction clutch, such accelerations generate peripheral forces which act upon the structural parts. For example, inertia of the adjusting ring 17 can cause the adjusting ramps 18, 19 which are active in the region between the adjusting ring 17 and the housing 2 to generate an axial component of force which acts in the direction toward the diaphragm spring 4 and is opposed to the resultant sensor force and this, too, can initiate an undesirable adjustment. Moreover, the developing vibrations can reduce the frictional engagement between the adjusting ramps 18, 19 so that the two adjusting ramps 18, 19 can be shifted relative to each other. In order to eliminate the aforediscussed drawbacks, the invention provides means or undertakings which prevent an undesirable adjustment by the wear compensating assembly 16 at least within the critical RPM ranges. To this end, the ring-shaped adjusting element 17 which is illustrated in the embodiment of FIGS. 1 and 2 is yieldable in the radial direction so that it exhibits the tendency to expand radialy under the action of centrifugal force. In order to permit such radial expansion, the adjusting ring 17 of the embodiment shown in FIGS. 1 and 2 is interrupted in the region 25 (FIG. 2) so that the adjusting ring 17 can change its diameter against the resistance of its elasticity or springiness.

The housing 2 is provided with stops 26 which can serve as an abutment for the ring-shaped adjusting element 17 in a radial direction to thus establish a form- or friction-locking connection between the adjusting element 17 and the stops 26 of the housing 2, and such connection prevents undesirable adjustments by the adjusting assembly 16 when the friction clutch 1 rotates. Thus, the adjusting assembly 16 is blocked at least when a predetermined RPM is exceeded. The stops 26 are formed by tongue-like portions which are of one piece with and are partially carved out of the housing which is made of sheet metal, and such tongue-like portions cooperate with the outer peripheral surface of the adjusting element 17. When the RPM drops below a predetermined RPM or below a predetermined RPM range, or at least at such times when the friction clutch 1 is not rotated, a connection between the adjusting element 17 and the stops 26, which would prevent an adjustment by the adjusting assembly 16, is interrupted or is at least reduced to a value which enables the springs 20 to turn the adjusting element 17.

It is of advantage to provide for the ring-shaped adjusting element 17 a radially inner centering or supporting means which prevents excessive radially inward deformation of the adjusting element 17. This ensures that the seat 12, which in the illustrated embodiment is formed directly by the adjusting element 17, cannot reduce its diameter to an undesirably small value. For example, the radially inner guidance or centering of the ring-shaped adjusting element 17 can be effected by the rivet elements 15 which cooperate with guide portions 17a provided in the radially inward region of the adjusting element 17. The illustrated embodiment comprises three such rivet elements 15.

If there is provided a radially inner support for the adjusting element 17, the latter can be mounted in such a way that it bears against the radially inner support with a predetermined radial force so that it is possible to turn the adjusting element 17 only above a predetermined rotational speed or RPM. At the same time, the abutment which is established by the stops 26 blocks the ability of the adjusting element 17 to turn relative to the housing 2 at a higher RPM. Thus, any turning of the adjusting element 17 is possible only within an RPM range which is not critical for the adjusting assembly 16. However, the adjusting element 17 can be blocked, i.e., force-lockingly held, within the critical RPM ranges.

Figure 3:
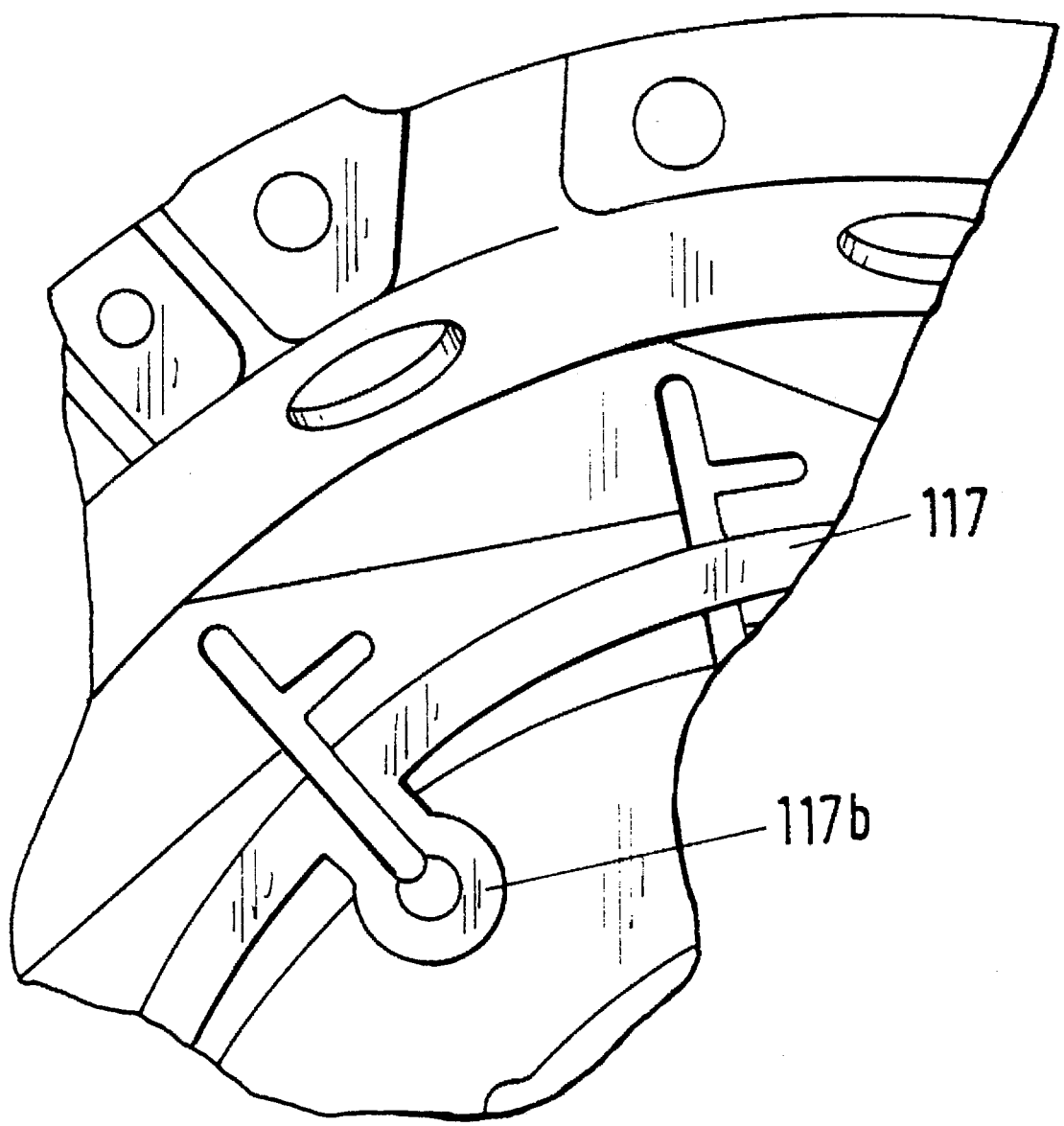

In an embodiment of the ring-shaped adjusting element 117 as shown in FIG. 3, the adjusting element 117 is circumferentially complete, i.e., coherent, as seen in the circumferential direction, but comprises at least one portion 117b which is resiliently yieldable at least in the circumferential direction and permits a springy or elastic radial deformation of the element 117. The springy portion 117b can extend radially inwardly, as shown in FIG. 3; however, it can also extend radially outwardly. The resiliently yieldable portion 117b is loop shaped.

Figure 4:
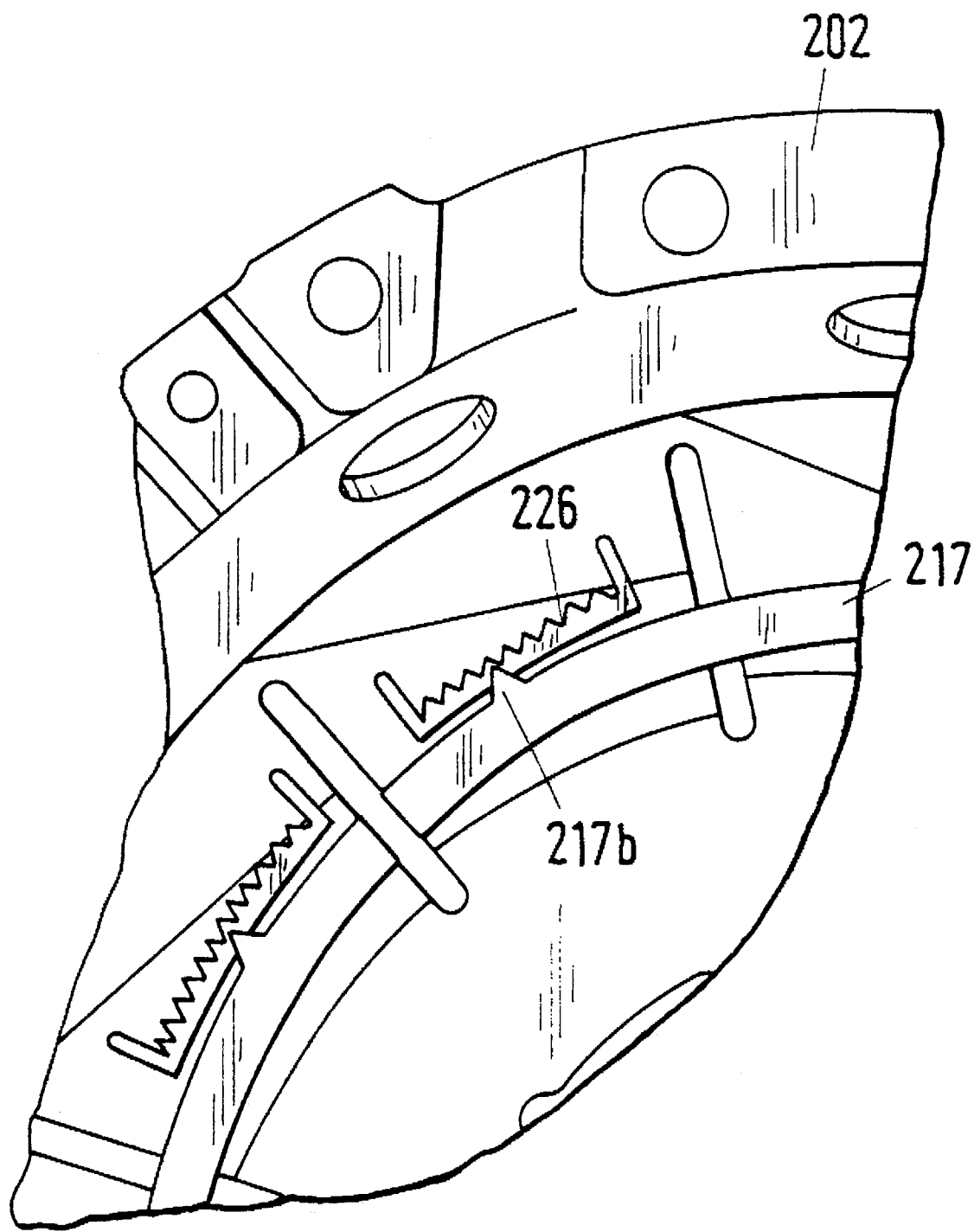

In the embodiment which is illustrated in FIG. 4, the ring-shaped adjusting element 217 comprises at least one profiling or a nose-like detent 217b which cooperates with a detent 226, carried or formed by the housing 202, in response to an enlargement of the ring 217 due to the action of centrifugal force when the friction clutch rotates. The length of the detent 226 is selected in such a way that a blocking of the ring 217 is possible during the entire useful life of the friction clutch. It is preferred to provide several detent noses 217b and detents 226 which are distributed in the circumferential direction of the housing 202. The penetration of such noses 217b into the complementary profiles which are formed by the detents 226 ensures a form-locking retention of the ring 217 against rotation relative to the housing 202.

In accordance with a modification of the structure shown in FIG. 4, the housing 202 can also be provided with a shaped portion corresponding to the nose 217b, and the periphery of the ring 217 can carry at least one profiling corresponding to the detent 226.

Figure 5:
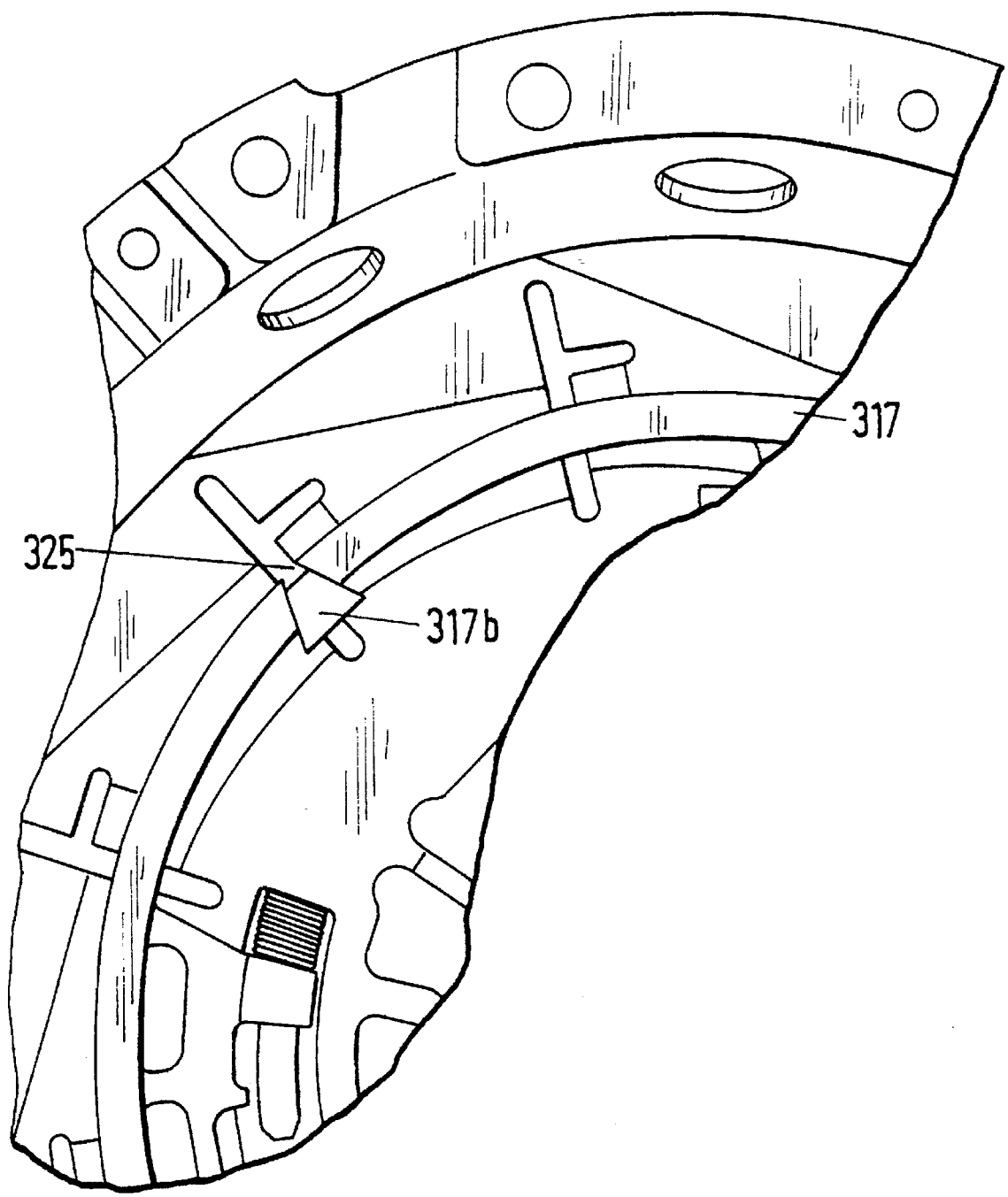

In the embodiment of FIG. 5, the ring-shaped adjusting element 317 is provided with an interruption 325 at the location of which there is provided a flyweight 317b serving to effect a radial widening of the adjusting ring 317. The interruption 325 has the configuration of a wedge or cone, as seen in the radial direction, and the tip of the wedge points in the direction of taper of the interruption 325 and thus points radially outwardly. The flyweight 317b conforms to the wedge- or cone-shaped configuration of the interruption 325.

Figure 6:
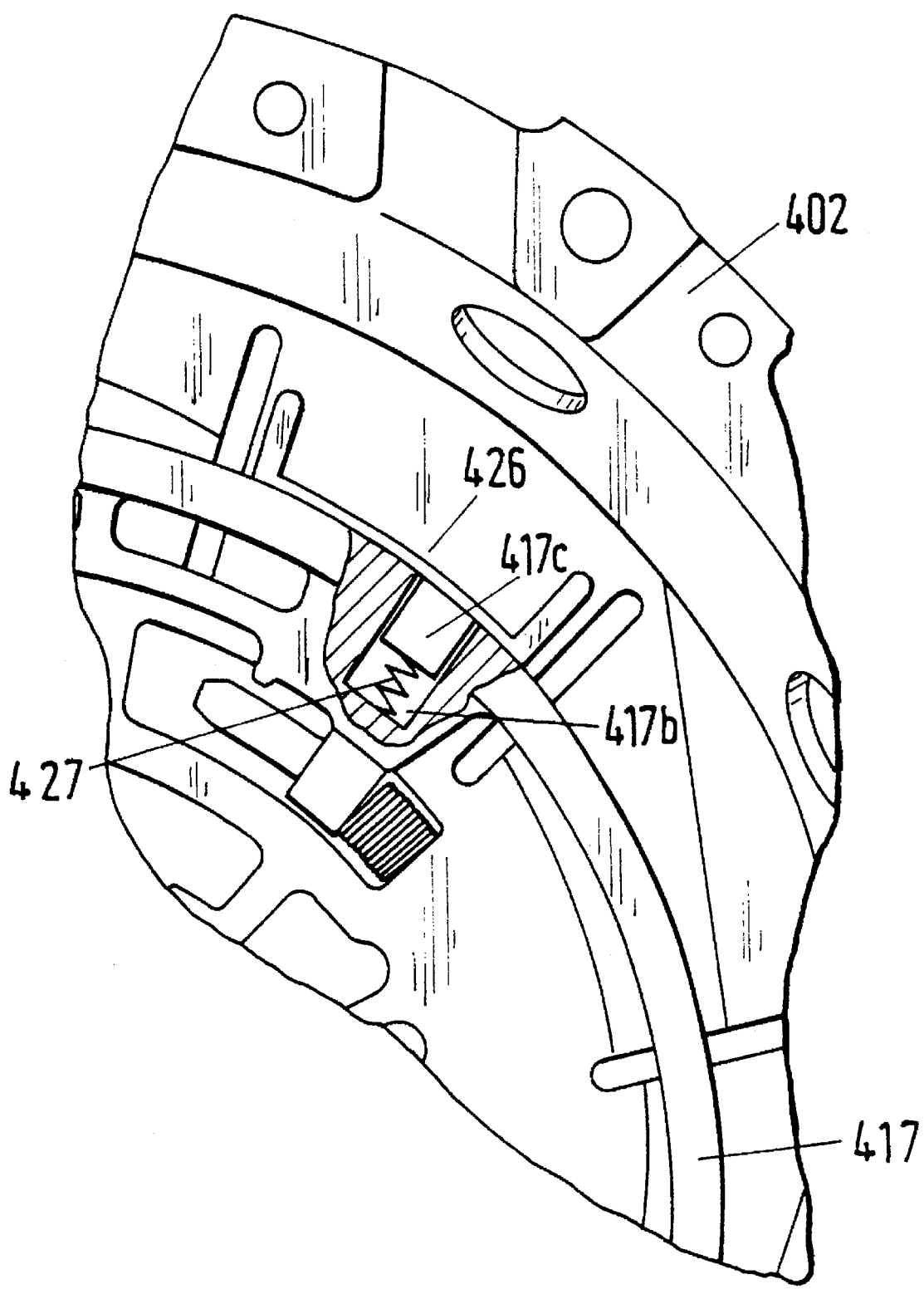

In FIG. 6, the adjusting element 417 is circumferentially complete but is provided with recesses or receiving portions 417b each of which receives or guides at least one flyweight 417c. Such a flyweight 417c bears against abutment portions 426, which are carried by the housing 402, at least when acted upon by centrifugal force. In many instances, it may be advisable to provide an energy storing device, such as for example a coil spring 427, which applies to the corresponding flyweight 417c a force acting in the radial direction. Depending on the actual use of the friction clutch, such force can hold back the flyweight 417c in the radial direction, i.e., it can urge the flyweight radially inwardly, or it can apply a small bias radially outwardly in a direction toward the portions 426.

Figure 7:
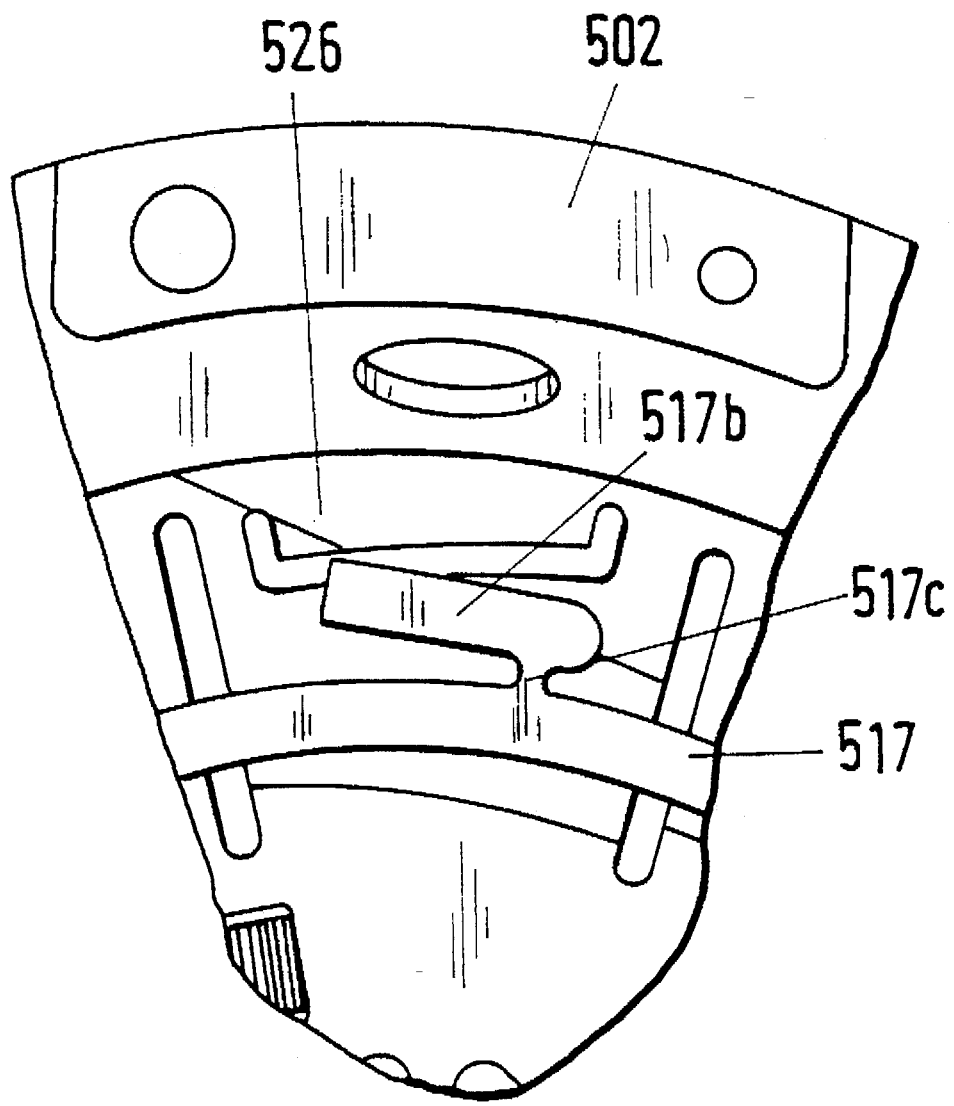

In the embodiment which is shown in FIG. 7, the adjusting element 517 carries at least one centrifugal-force-dependent element 517b which can bear against supporting portions 526 borne by the housing 502. The centrifugal-force-dependent element 517b is of one piece with the ring 517 and is connected with the latter by a resiliently deformable portion 517c which acts not unlike a pivotable hinge. The centrifugal force element 517b is non-symmetrical with reference to the pivotable portion 517c as seen in the circumferential direction.

Figure 8:
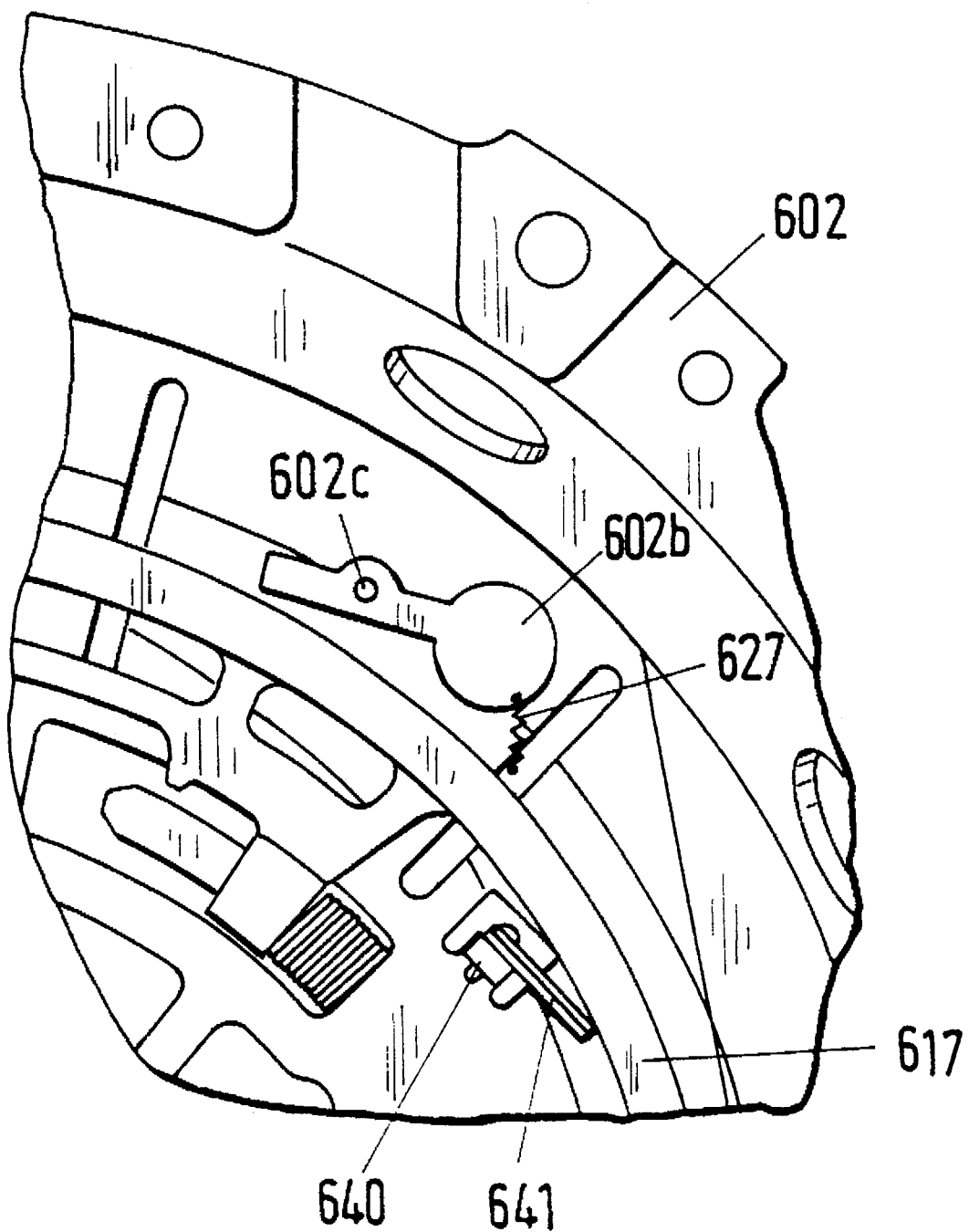

In the embodiment which is illustrated in FIG. 8, the housing 602 carries at least one element 602b which is pivotable under the action of centrifugal force. For example, such element 602b can be rotatably mounted on a pin 602c to constitute a two-armed lever. As can be seen in FIG. 8, the mass of the right-hand lever arm is greater so that, when acted upon by centrifugal force, this lever arm is pivoted about the rotational axis 602c radially outwardly. Therefore, the left-hand lever arm is pivoted radially inwardly and is caused to bear upon the adjusting element 617 so that the latter is held against rotation. It can be of advantage if the centrifugal force element 602b is biased by an energy storing device, such as for example a coil spring 627, to a position in which the adjusting ring 617 is released, at least when the clutch is not rotated.

Figure 9:
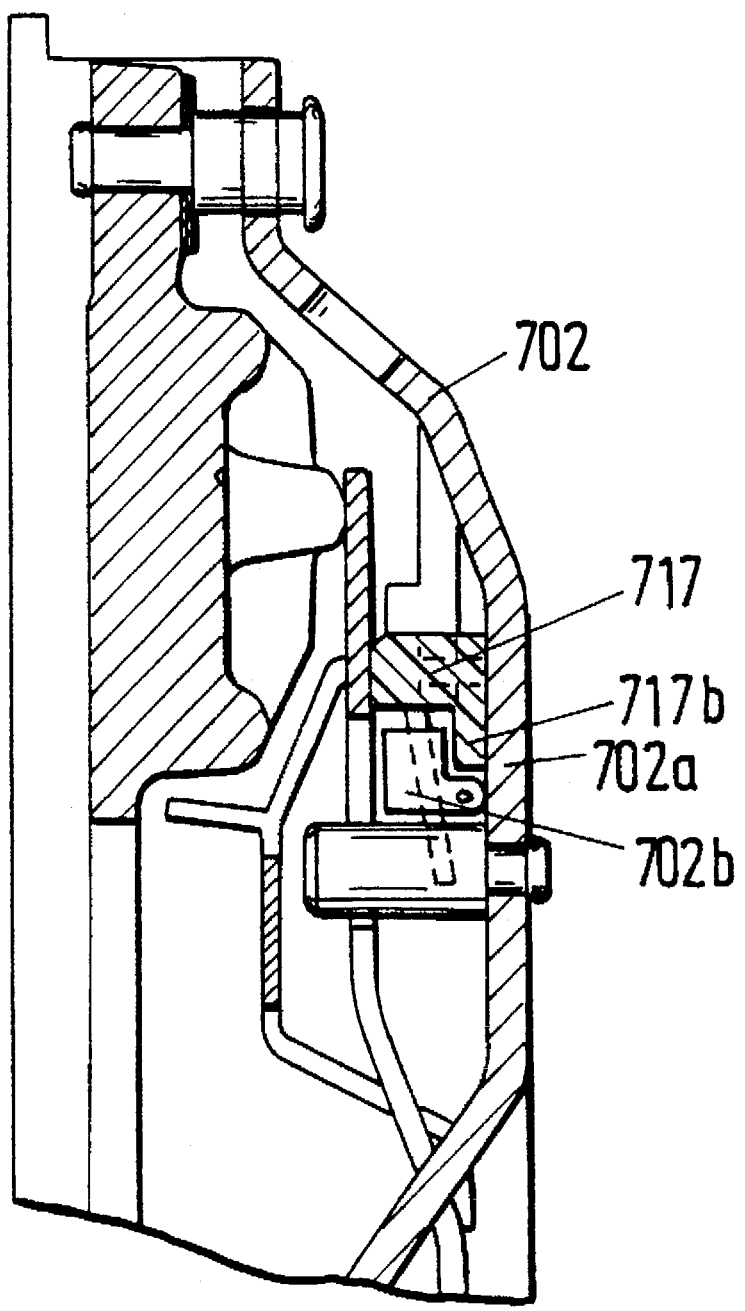

In the embodiment of FIG. 9, there is also provided at least one centrifugal-force-dependent element 702b which is pivotable relative to the housing 702. In contrast to the element 602b which is shown in FIG. 8, the element 702b does not apply a radial force to the adjusting element 717 but rather an axial force so that at least the portion 717b of the adjusting ring 717 is clamped axially between the bottom 702a of the cover 702 and the flyweight 702b. In this manner, it is possible to urge the ramps of the adjusting assembly against each other with a greater force.

Figure 10:
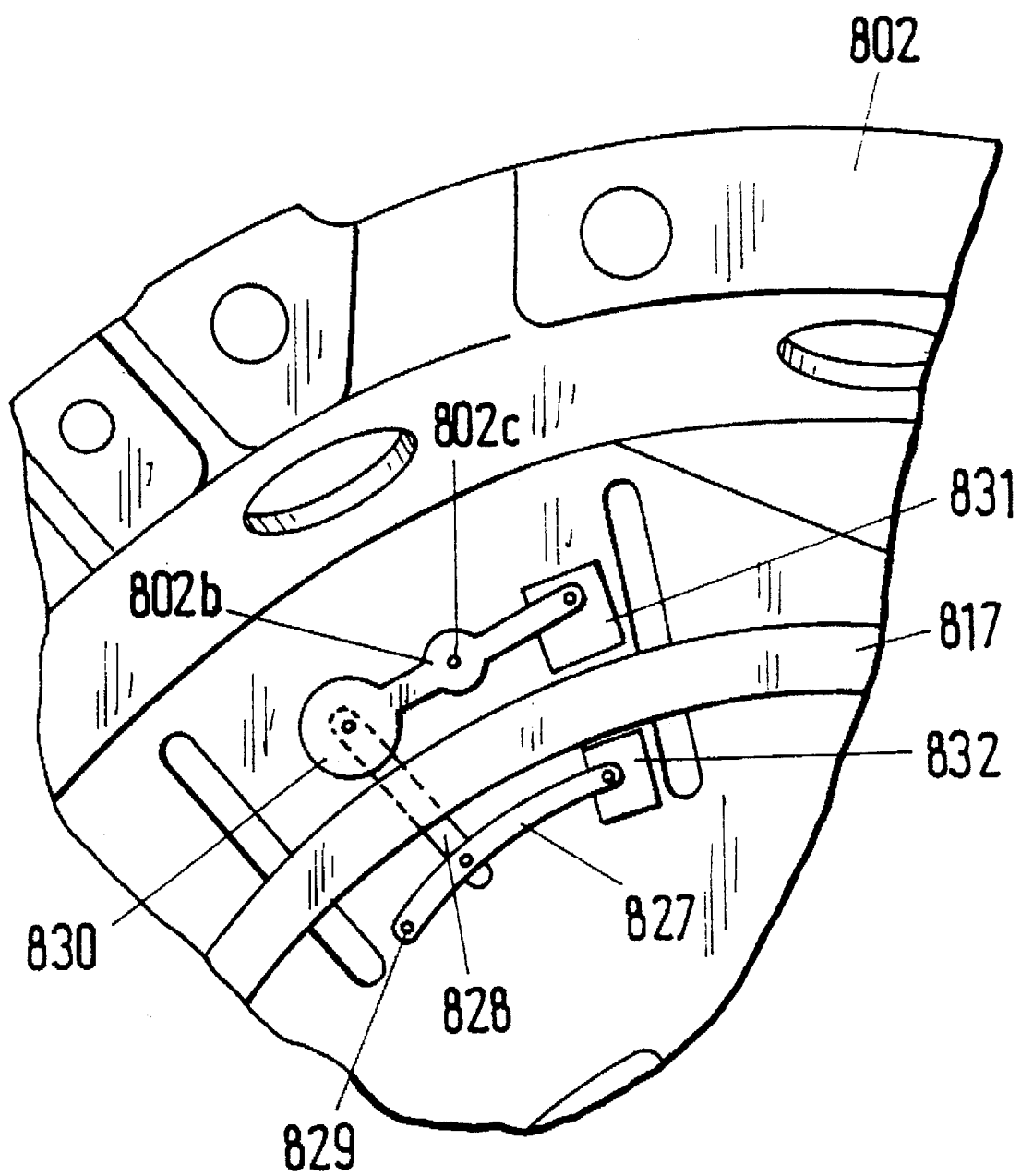

In the embodiment of FIG. 10, the housing 802 pivotably mounts a pivotable braking element 802b which is designed to constitute a flyweight and is designed in a manner similar to that of the element 602b of FIG. 8. The centrifugal force element 802b is connected with a further braking element 827, which is disposed radially within the ring-shaped adjusting element 817, by an arm 828 which is pivotably secured to each of the two elements 802b and 827. The element 827 is pivotably mounted on the housing 802 in the region 829. When acted upon by centrifugal force, the centrifugal force element 802b pivots about the rotational axis 802c in such a way that the mass 830 of the centrifugal force element 802b is moved radially outwardly whereby a braking portion or shoe 831 is pivoted radially inwardly and engages the adjusting element 817. As a result of pivoting of the braking shoe 802b, the lever-shaped other braking element 827 which is located at the other side of the adjusting element 817 is pivoted radially outwardly by the arm 828 so that a braking or blocking portion or shoe 832 of the element 828 engages the adjusting element 817, preferably radially opposite the braking or blocking shoe 831. The blocking assembly of FIG. 10 operates in a manner similar to that of a disc brake or shoe brake.

Figure 11:
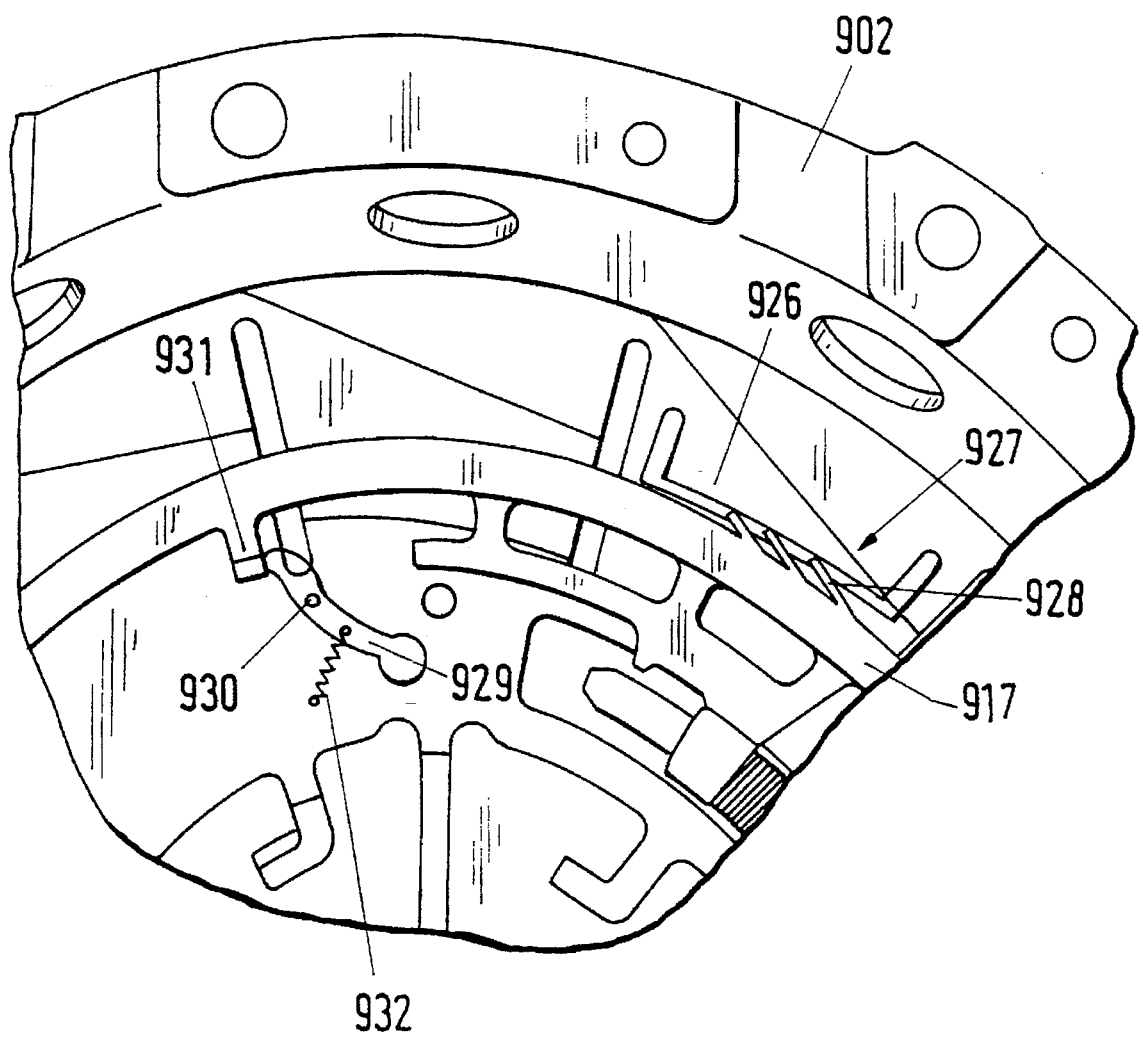

In the embodiment of a blocking assembly for the wear compensating assembly according to FIG. 11, there is provided a freewheel device 927 which is disposed between the ring-shaped adjusting element 917 and the housing 902 and which permits rotation of the adjusting element 917 merely in a direction to compensate for wear. The freewheel device 927 of the embodiment of FIG. 11 comprises radially elastic lugs 928 which are formed on the radially outer portion of the adjusting element 917 and which can engage, at least under the action of centrifugal force, a braking or blocking portion 926 provided on the housing 902. In a manner similar to that described in connection with the portion detent 226 shown in FIG. 4, the portion 926 can be provided with profiles which cooperate with the lugs 928.

The housing 902 carries a centrifugal force element or flyweight 929 which is a two-armed lever pivotally mounted on a shaft 930. When acted upon by centrifugal force, the centrifugal force element 929 bears upon a contact portion 931 of the adjusting element 917 to thus apply to the adjusting element 917 a turning or rotation imparting force which effects a blockage of the freewheel device 927. It can be of advantage if the centrifugal force element 929 is acted upon by a spring element 932 in a direction to release the contact portion 931 and hence the adjusting element 917. In this manner, one ensures that, when the friction clutch is idle, the wear compensating or adjusting assembly is operative so that, when the friction clutch is engaged, an adjustment can take place provided that the friction linings have undergone wear.

FIG. 8 illustrates a further braking or blocking device 640 for the adjusting element 617. The blocking device 640 is also carried by the housing 602 and constitutes a temperature-dependent arrangement. To this end, the device 640 comprises a thermoelement 641, i.e., an element which can be thermally influenced and the construction of which can be based, for example, upon the bimetallic principle or upon the memory effect. The device 640 is effective at a certain temperature and blocks the wear compensating assembly, i.e., the adjusting element 617. The temperature-dependent braking or blocking device 640 is preferably designed in such a way that the adjusting assembly can carry out an adjusting operation in response to actuation of the friction clutch and when the temperature is below a predetermined value but the adjusting assembly is blocked when such temperature is exceeded.

In accordance with a non-illustrated embodiment, the ring-shaped adjusting element (for example the element 17 shown in FIGS. 1 and 2) can be composed of several segment-shaped parts and such segment-shaped parts can be held together by a surrounding resilient element.

It is preferred to provide several braking or blocking devices which are symmetrically or uniformly distributed at the periphery of the friction clutch.

The aforedescribed braking or blocking devices can also be put to use in friction clutches wherein the wear compensating or adjusting assembly is disposed between the biasing spring, such as especially the diaphragm spring 4, and the pressure plate 3. Such embodiments are shown and described in the aforementioned prior art. For example, the braking or blocking devices for the adjusting assembly can be put to use between the pressure plate 1103 and the ring-shaped element 1126 of the wear compensating assembly 1101 shown in FIG. 29 of the published German patent application 42 39 289. Thus, and by way of example, instead of being carried by the housing of a friction clutch, the aforedescribed flyweights can be supported by the pressure plate 1103 and are then capable of cooperating with the ring-shaped element 1126. In this manner, when the friction clutch is rotated, the ring-shaped element 1126 can be secured against rotation and/or against axial displacement relative to the pressure plate 1103 to thus render it possible to avoid undesirable adjustment within the wear compensating assembly 1101.

The patent claims which are being filed with the application are merely formulation proposals without prejudicing the attempt to obtain broader patent protection. The assignee reserves the right to claim additional features which, heretofore, are disclosed only in the description and/or in the drawings.

The dependencies pointed out in the dependent claims point out additional modifications of the subject matter of the independent claim by the addition of features recited in the respective dependent claims; they are not to be understood to constitute an abandonment of seeking independent separate protection for the features of the claims depending from the independent claim.

Thus, the subject matter of each dependent claim constitutes an independent invention different from that recited in the other or preceding dependent claims.

Furthermore, the invention is not limited to the embodiments which are referred to in the description. Thus, it is within the scope of the invention to carry out numerous changes and modifications, especially those modifications, elements and combinations and/or materials which, e.g., by combining or modifying individual features and/or elements and/or method steps which were described in the general description or in connection with the specific embodiments as well as in the claims, constitute inventions and, as a result of resort to combinable features, lead to a novel device or to novel method steps or sequences of method steps, also insofar as they pertain to manufacturing, testing and processing procedures.

What is claimed is:

1. An engageable and disengageable friction clutch, comprising a housing rotatable with a counterpressure plate about a common axis; a pressure plate disposed between said housing and said counterpressure plate, rotatable with said housing and having limited freedom of movement in the direction of said axis; at least one clutch spring operative to bias said pressure plate in the direction of said axis toward said counterpressure plate to thus engage the clutch; a rotary clutch disc having friction linings disposed between said plates and being subject to wear in response to repeated engagement and disengagement of the clutch; means for disengaging the clutch; and means for compensating for wear at least upon said friction linings by moving said pressure plate axially toward said counterpressure plate through distances commensurate with said wear, including at least one substantially annular member (a) movable relative to at least one of said housing and said pressure plate, (b) supportable by at least one of said housing and said pressure plate, (c) at least indirectly biased by said at least one clutch spring against one of said housing and said pressure plate and (d) adapted to be blocked by at least one second member—as a function of at least one of a plurality of parameters which develop in actual use of the clutch and include the RPM of said housing, the magnitude of centrifugal force acting upon at least one rotary component of the clutch, the temperature in the region of at least one part of the clutch, and the extent of movement covered by an element of the clutch during disengagement of the clutch—against displacement in at least one of two directions including a displacement in the direction of said axis and a displacement in a circumferential direction of said pressure plate relative to that one of said housing and said pressure plate against which said at least one substantially annular member is biased by said at least one clutch spring, said at least one substantially annular member comprising at least one first portion movable substantially radially of said axis as a function of said at least one parameter into engagement with at least one second portion forming part of said at least one second member, said at least one second member being arranged to rotate with said housing and being at least indirectly carried by one of said housing and said pressure plate.

2. The clutch of claim 1, wherein said at least one substantially annular member is biased by said at least one clutch spring in the direction of said axis and said at least one first portion is movable by the centrifugal force constituting said at least one parameter and developing in response to rotation of said plates to bear upon said at least one second portion and to thus establish between said members at least one of a plurality of connections including a form-locking connection and a frictional connection to thus prevent unintentional compensation for wear at least upon said friction linings.

3. The clutch of claim 1, wherein said at least one substantially annular member is at least indirectly biased by said at least one clutch spring and is expandible substantially radially of and away from said axis under the action of the centrifugal force which constitutes said at least one parameter and develops during rotation of said plates to thus establish between said first and second portions at least one of a plurality of connections including a form-locking connection and a frictional connection, said at least one second member being arranged to block the compensation for wear at least upon said friction linings in response to the establishment of said at least one connection.

4. The clutch of claim 3, wherein said at least clutch spring includes a diaphragm spring which is pivotable relative to an annular seat assembly provided on said housing, said diaphragm spring bearing upon said pressure plate to urge the pressure plate in the direction of said axis toward said friction linings.

5. The clutch of claim 3, wherein said at least one substantially annular member is directly biased by said at least one clutch spring.

6. The clutch of claim 3, wherein said at least one first portion is a resilient portion which is deformable substantially radially of and away from said axis under the action of centrifugal force.

7. The clutch of claim 3, wherein said at least one substantially annular member includes a peripheral section which is interrupted at least at one location to thus permit substantially radial expansion of said at least one substantially annular member.

8. The clutch of claim 3, wherein said at least one substantially annular member has a circumferentially complete radially outer peripheral section and said at least one first portion is a resilient portion which is expandible in a circumferential direction of said plates.

9. The clutch of claim 3, wherein said at least one substantially annular member includes a peripheral section which is interrupted at least at one location and said at least one first portion comprises at least one flyweight disposed at said location and movable substantially radially of and away from said axis under the action of centrifugal force to thus expand said at least one substantially annular member.

10. The clutch of claim 9, wherein said at least one location has one of conical and wedge-like configurations diverging substantially radially of and toward said axis, said at least one flyweight having a configuration complementary to said one configuration.

11. The clutch of claim 3, wherein said at least one connection comprises at least one tooth constituted by one of said first and second portions, and at least one tooth space for said at least one tooth provided on the other of said first and second portions and receiving said at least one tooth in response to expansion of said at least one substantially annular member.

12. The clutch of claim 1, wherein said at least one substantially annular member further comprises a circumferentially complete ring and said at least one first portion includes at least one flyweight movably carried by said ring and engaging said at least one second portion under the action of centrifugal force which constitutes said at least one parameter and develops in response to rotation of said plates whereby said at least one second member blocks said at least one substantially annular member.

13. The clutch of claim 12, further comprising means for pivotally connecting said at least one flyweight to said ring.

14. The clutch of claim 1, wherein said at least one second portion comprises a flyweight which is movably carried by one of said housing and said pressure plate to block said at least one substantially annular member under the action of centrifugal force which constitutes said at least one parameter and develops in response to rotation of said plates.

15. The clutch of claim 14, further comprising means for pivotally connecting said at least one flyweight to one of said housing and said pressure plate.

16. The clutch of claim 14, wherein said at least one flyweight is arranged to apply to said at least one substantially annular member a force acting substantially radially of said axis in response to rotation of said plates.

17. The clutch of claim 14, wherein said at least one flyweight is arranged to apply to said at least one substantially annular member a force acting at least substantially in the direction of said axis in response to rotation of said plates.

18. The clutch of claim 1, wherein said at least one second member includes at least one temperature-responsive device which constitutes said part of the clutch and is operative to block said at at least one substantially annular member within at least one predetermined temnperature range.

19. The clutch of claim 1, wherein said housing is rotatable by an output element of a prime mover in a motor vehicle.

* * * * *